United States Patent [19]
Boyer et al.

[11] Patent Number: 5,653,007
[45] Date of Patent: Aug. 5, 1997

[54] METHOD FOR PRODUCING A BICYCLE FORK BRAKE ARCH AND LEGS ASSEMBLY

[75] Inventors: Scott M. Boyer, Valencia; Gerald M. Stewart, Camarillo; Mark Van Kampen, Tarzana; Kirk Allen, Reseda, all of Calif.

[73] Assignee: Answer Products, Inc., Valencia, Calif.

[21] Appl. No.: 422,855

[22] Filed: Apr. 17, 1995

[51] Int. Cl.⁶ ..................................... B23P 19/04
[52] U.S. Cl. .......................... 29/460; 29/525.01; 280/276
[58] Field of Search ................... 29/469.5, 525.1, 29/527.5, 525.01, 525.13, 455.1, 460; 280/279, 280, 277, 276; 156/305

[56] References Cited

U.S. PATENT DOCUMENTS

| | | | |
|---|---|---|---|
| D. 349,434 | 8/1994 | Hammer et al. | D12/118 |
| 4,415,387 | 11/1983 | Newman | 29/469.5 X |
| 4,971,344 | 11/1990 | Turner | 280/276 |
| 4,993,735 | 2/1991 | Chen | 280/280 |
| 5,186,481 | 2/1993 | Turner | 280/276 |
| 5,238,259 | 8/1993 | Wilson et al. | 280/279 |
| 5,284,352 | 2/1994 | Chen | 280/276 |
| 5,398,954 | 3/1995 | Chonan | 280/276 |

*Primary Examiner*—Peter Vo
*Assistant Examiner*—Khan V. Nguyen
*Attorney, Agent, or Firm*—Thomas I. Rozsa; Tony D. Chen

[57] ABSTRACT

A method for producing a bicycle brake arch and fork legs assembly. The method comprises the steps of first forming a low-tolerance brake arch and two low tolerance fork legs separately, and then bonding the brake arch with the two fork legs in high-precision alignment and orientation with a structural adhesive.

22 Claims, 3 Drawing Sheets

METHOD FOR PRODUCING A BICYCLE FORK BRAKE ARCH AND LEGS ASSEMBLY

BACKGROUND OF THE INVENTION

1. Field of the Invention

The present invention relates to the field of design and construction of bicycle frames. More particularly, the present invention relates to the field of design and construction of the front suspension forks for bicycles.

2. Description of the Prior Art

A typical bicycle front fork includes the following main components: a steering tube, a crown, and two front legs. The steering tube is connected to the handlebar. The crown interconnects the steering tube and the two legs.

Many bicycle fork legs now utilize various suspension systems. Commonly a suspension leg utilizes a telescoping assembly which includes an upper tube and a lower tube. The upper and lower tubes are slidably engaged with damping devices to form a suspension leg.

In bicycles utilizing wheel rim brakes, a brake arch is often attached between the two fork legs. The brake arch is typically a reversed U-shaped member having a bent top section and two straight lower sections integrally connected to opposite ends of the bent top section.

The brake arch serves several functions. First, the bent top section often carries a brake cable stop, and the two straight lower sections each carry a brake post; thereby serving as an integral part of the bicycle wheel rim brake mechanism. Second, it resists torsional and side loading forces exerted on the front legs, thereby preventing the twisting, rotating and separate movement of the legs. Third, it transmits and re-distributes the tension among the two legs, thereby helping the alignment and balance of the entire front fork.

In the prior art, the most common method of attaching the brake arch to the fork legs is by threaded fasteners. This type of attachment can be seen in U.S. Pat. Nos. 4,971,344 and 5,186,481 issued to Turner, U.S. Pat. No. 5,238,259 issued to Wilson et al., U.S. Pat. No. 5,284,352 issued to Chen, and U.S. Pat. No. 5,398,954 issued to Chonan.

A second prior art method of attaching the brake arch to the fork legs appears to be welding. As shown in U.S. Pat. No. Des. 340,434, the brake arch may be welded to the exterior sidewalls of the fork legs.

A third possible method of attaching the brake arch to the fork legs may be by press-fitting. According to this method, the bottom ends of the brake arch would have respective bracing members. The bracing member could be press-fitted with a portion of a fork leg.

The disadvantage of the press-fitting method is that it requires high-tolerance machining of both the brake arch and the fork legs to ensure high-precision alignment and orientation of the brake arch and the fork legs. Typically, high-precision press-fitting attachment requires a high-tolerance of less than ±0.003 inch. This requirement makes the machining of the brake arch and fork legs a very difficult and expensive task.

It is desirable to have a new method of producing a brake arch and fork legs assembly.

SUMMARY OF THE INVENTION

The present invention is a new method of producing a bicycle fork brake arch and legs assembly.

An object of the present invention is to provide a method of producing a bicycle fork brake arch and legs assembly without high-precision press-fitting. As discussed earlier, high-precision press-fitting requires high-tolerance machining of the brake arch and legs before they are assembled together. Using the new method of the present invention, both the brake arch and the legs can be die cast or forged or otherwise formed with low tolerance, without affecting the high-precision alignment and orientation of the brake arch and the legs.

In the present invention method, the brake arch and the fork legs are separately die cast or forged with low tolerance. The brake arch and the legs are then held in a fitting machine in a high-precision alignment and orientation, and bonded by a structural adhesive. Once the adhesive is solidified, the brake arch and legs form a unified high-precision assembly.

A novel feature of the present invention new method is that it utilizes a structure adhesive to bond the brake arch and fork legs. One advantage of this new method is that it can produce a high-precision bicycle fork assembly by using brake arch and fork legs die cast or forged with low-tolerance.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
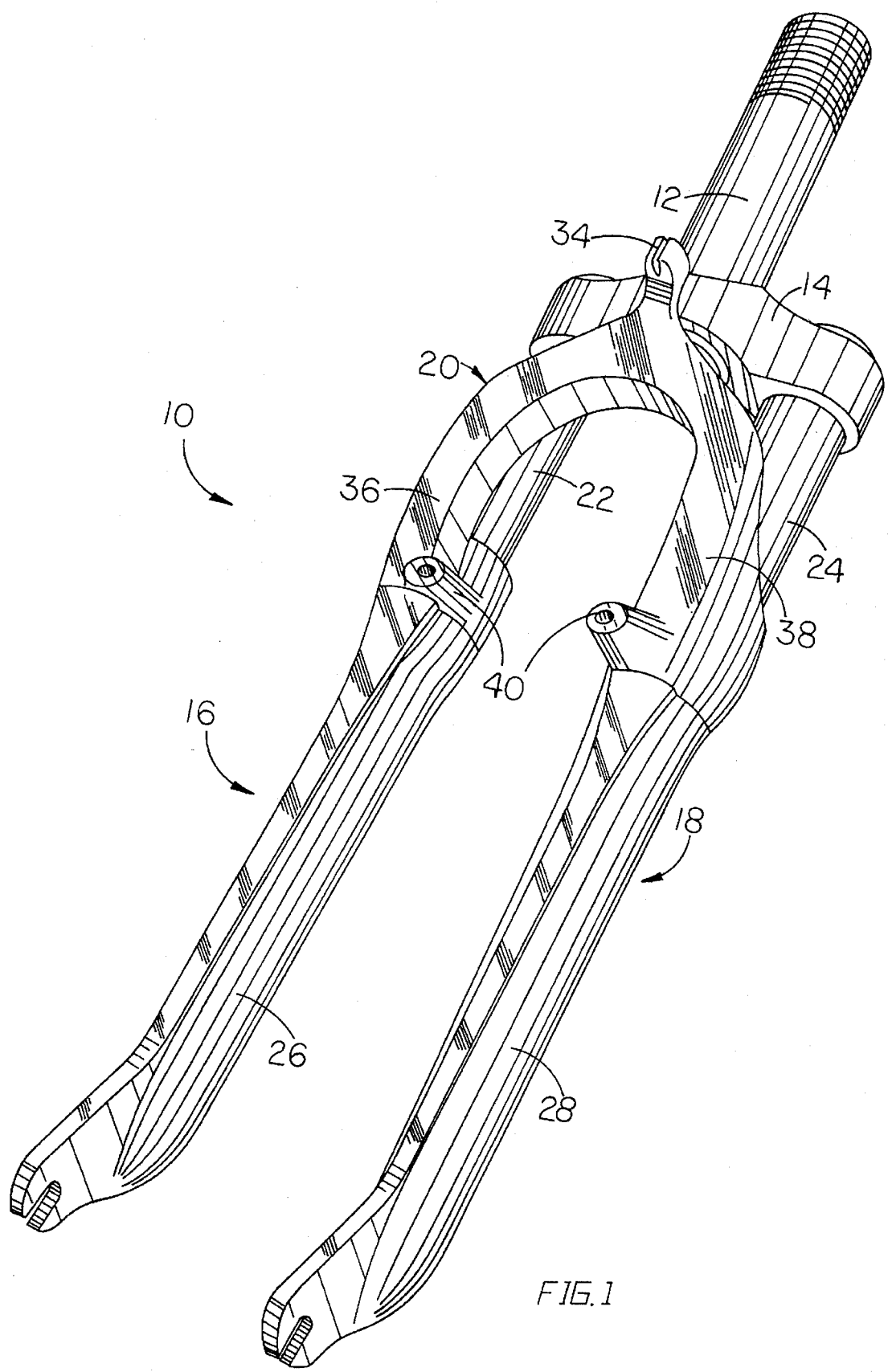
FIG. 1 is a perspective view of a bicycle front suspension fork which utilizes the brake arch and legs assembly produced by the present invention method.

Referring to FIG. 1, there is shown at 10 a bicycle suspension fork produced by the present invention method. The fork 10 is to be mounted between a frame part, typically the handlebars (not shown in the drawing), and a wheel axle, typically front wheel axle (not shown in the drawing), of a bicycle. The main components of fork 10 include a steering tube 12, a crown 14, two parallel fork legs 16 and 18, and a brake arch 20. The fork legs 16 and 18 each has a telescoping suspension system. The telescoping suspension system of leg 16 includes an upper leg 22 and a lower leg 26. Similarly, the telescoping suspension system of leg 18 also includes an upper leg 24 and a lower leg 28. The lower legs 26 and 28 each have a respective dropout 30 for mounting onto the front wheel axle (not shown in the drawing).

Figure 2:
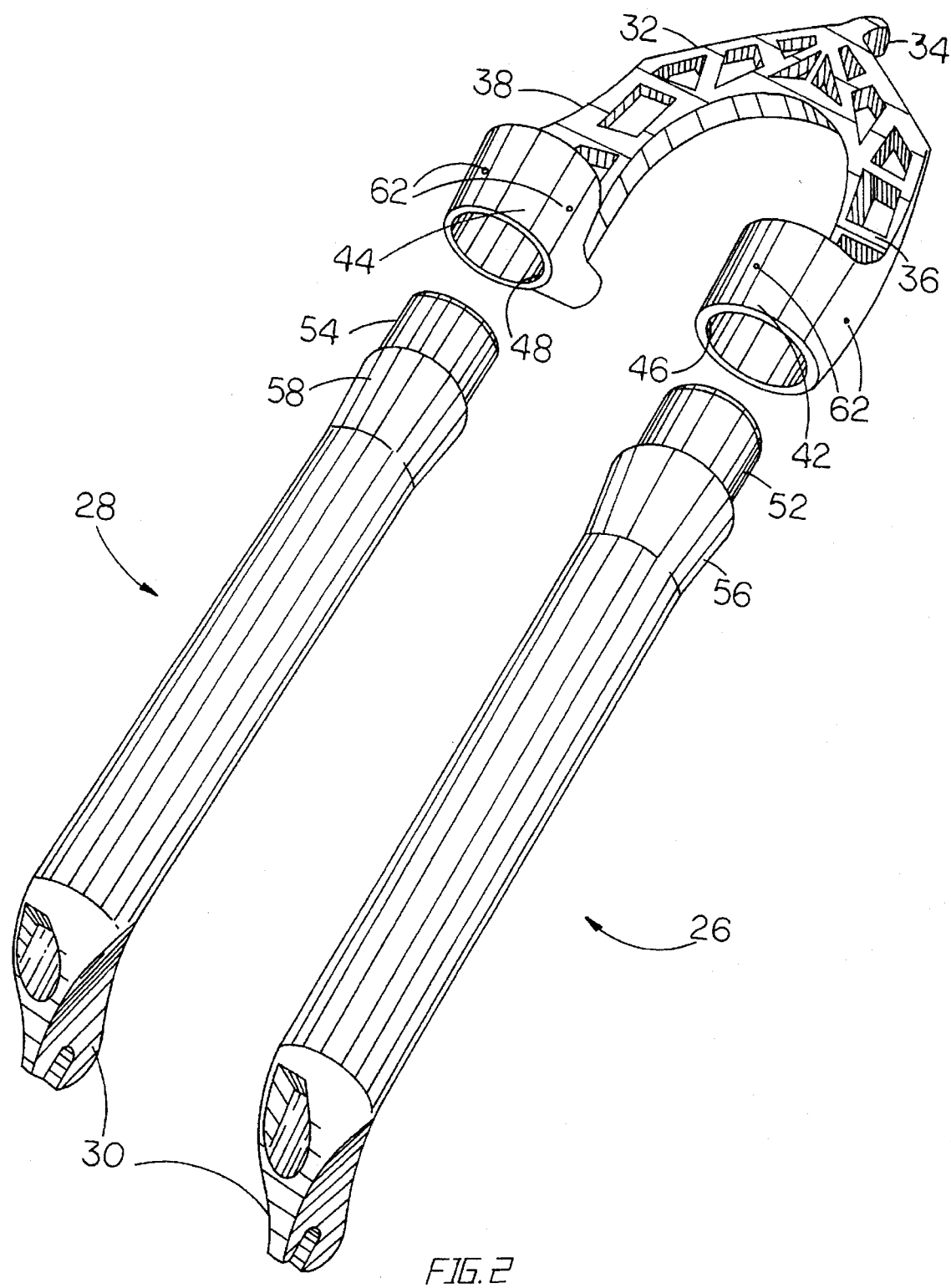
FIG. 2 is a partial exploded perspective view of the brake arch and fork legs assembly.

Referring to FIGS. 1 and 2, the brake arch 20 has a U-shaped body with a bent top section 32 and two generally straight lower sections 36 and 38. The bent top section has a brake cable stop 34 for attaching the brake cable. The generally straight lower sections 36 and 38 each have a brake post 40 for attaching the wheel rim brake. The brake cable stop 34 and the brake posts 40 are integral parts of the brake arch 20.

Referring to FIG. 2, the brake arch 20 has two integral short tubular connectors 42 and 44. The tubular connector 42 is located at the bottom end of generally straight section 36, and has a through bore 46 for receiving the upper end 52 of lower leg 26. Likewise, tubular connector 44 is located at the bottom end of generally straight section 38, and has a through bore 48 for receiving the upper end 54 of lower leg 28. Lower leg 26 has a flange 56 which has a similar profile as the tubular connector 42 and serves as a stop for the tubular connector 42. Similarly, lower leg 28 has a flange 58 which has a similar profile as the other tubular connector 44 and serves as a stop for the other tubular connector 44.

The brake arch 20 and the two lower legs 26 and 28 are assembled by the present invention method described as follows. First, the brake arch 20 and the two lower legs 26 and 28 are separately die cast, or forged, or machined, or otherwise formed with low tolerance, which is typically greater than ±0.005 inch. Second, the brake arch 20 and the two lower legs 26 and 28 are held in position by a fitting machine in high-precision alignment and orientation, where the upper end 52 of lower leg 26 is inserted into bore 46 of the tubular connector 42 at the lower end of the generally straight section 36 of brake arch 20, and the upper end 54 of lower leg 28 is inserted into bore 48 of the tubular connector 44 at the lower end of the generally straight section 38 of brake arch 20. Third, structural adhesive is used to bond tubular connector 42 with the upper end 52 of lower leg 26, and bond tubular connector 44 with the upper end 54 of lower leg 28.

Figure 3:
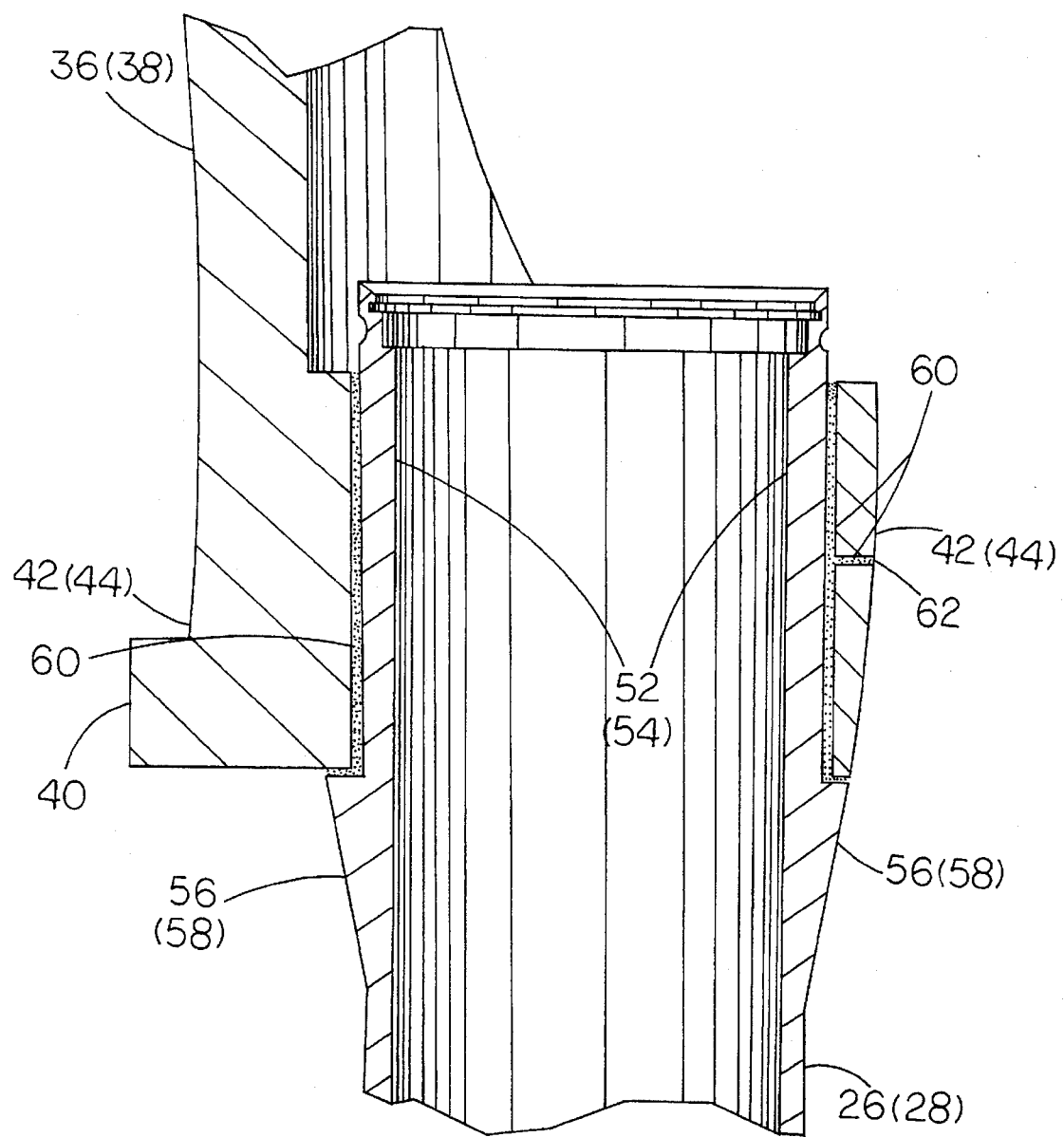
FIG. 3 is a cross-sectional view showing the structural adhesive bonding.

As shown in FIG. 3, the structural adhesive 60 is injected between the sidewall of upper end 52 (or 54) of lower leg 26 (or 28) and the sidewall of tubular connector 42 (or 44) through small injection ports 62 on the sidewall of the tubular connector 42 (or 44). Once the adhesive 60 is solidified, brake arch 20 and the two lower legs 26 and 28 are bonded as a unified piece. The upper legs 22 and 24 are then installed into the two lower legs 26 and 28 respectively with slidable engagement, and finally attached to the crown 14.

Another way to apply the adhesive is to apply the adhesive to the outside surface of the sidewalls of the respective upper ends 52 and 54 of the lower legs 26 and 28, and also to the inside surface of the sidewalls of tubular connectors 42 and 44 of the brake arch 20, and slide these parts together and hold them in high-precision alignment and orientation, and then wipe out any excessive adhesive.

One structural adhesive which may be used in connection with the present invention method is epoxy. It is emphasized that the examples and numerical values given in this specification are for the purpose of illustration only, and shall not be construed as a limitation on the scope of the present invention.

One of the most important novel features of the present invention new method of producing bicycle forks is that the brake arch and fork legs are bonded by structural adhesive, unlike prior art methods where bolt fastening, welding or press-fitting is utilized to attached the brake arch to the fork legs. The principal advantage of the present invention new method is that it produces a high-precision brake arch and legs assembly with low tolerance die cast or forged brake arch and fork legs. The perfect alignment and orientation of the brake arch and fork legs are insured, while production time and cost are reduced.

Defined in detail, the present invention is a method for producing a bicycle brake arch and fork legs assembly, comprising the steps of: (a) forming a low-tolerance brake arch which has a generally U-shaped body with a bent top section, and two generally straight sections each having an integral tubular connector, where each tubular connector is located at a bottom end of a respective one of the two generally straight sections and has a through bore; (b) forming two low-tolerance fork legs each having an upper end and a lower dropout; (c) holding said brake arch and two fork legs in high-precision alignment and orientation, where said upper ends of said two fork legs are inserted respectively into said through bores of said two tubular connectors of said brake arch; and (d) bonding said upper ends of said two fork legs with said two tubular connectors of said brake arch respectively with a structural adhesive; (e) whereby once said structural adhesive is solidified, said low tolerance brake arch and said two low tolerance fork legs are bonded as a unified piece with high-precision alignment and orientation.

Defined broadly, the present invention is a method for producing a bicycle brake arch and fork legs assembly, comprising the steps of: (a) forming a low-tolerance brake arch which has a generally U-shaped configuration with two integral connecting portions; (b) forming two low-tolerance fork legs each having an elongated body; (c) holding said brake arch and two fork legs in high-precision alignment and orientation, where each one of said two connecting portions of said brake arch is abutting a connecting portion of a respective one of said two fork legs; and (d) bonding said connecting portions of said of said two fork legs with said two connecting portions of said brake arch respectively with an adhesive; (e) whereby said low tolerance brake arch and said two low tolerance fork legs are bonded as a unified piece with high-precision alignment and orientation.

Defined more broadly, the present invention is a method for producing a bicycle brake arch and fork legs assembly, comprising the steps of forming a low-tolerance brake arch and two low tolerance fork legs separately, and adhering the brake arch with the two fork legs in high-precision alignment and orientation.

Defined alternatively broadly, the present invention is a method for producing a telescoping fork for bicycles, comprising the steps of: (a) forming a low-tolerance cross member which has a generally U-shaped configuration with two integral connecting portions; (b) forming two low-tolerance fork legs for said telescoping fork, each leg having an elongated body; (c) holding said cross member and two fork legs in high-precision alignment and orientation, where each one of said two connecting portions of said cross member is abutting a connecting portion of a respective one of said two fork legs; and (d) bonding said connecting portions of said of said two fork legs with said two connecting portions of said cross member respectively with an adhesive; (e) whereby said low tolerance cross member and said two low tolerance fork legs are bonded as a unified piece with high-precision alignment and orientation.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method for prducing a bicycle brake arch and fork legs assembly, comprising the steps of:
   a. forming a low-tolerance brake arch which has a generally U-shaped body with a bent top section, and two generally straight sections each having an integral tubular connector, where each tubular connector is located at a bottom end of a respective one of the two generally straight sections and has a through bore;
   b. forming two low-tolerance fork legs each having an upper end and a lower dropout;
   c. holding said brake arch and two fork legs in high-precision alignment and orientation, where said upper ends of said two fork legs are inserted respectively into said through bores of said two tubular connectors of said brake arch; and
   d. bonding said upper ends of said two fork legs with said two tubular connectors of said brake arch respectively with a structural adhesive;
   e. whereby once said structural adhesive is solidified, said low tolerance brake arch and said two low tolerance fork legs are bonded as a unified piece with high-precision alignment and orientation.

2. The method as defined in claim 1 wherein said brake arch is formed by die casting.

3. The method as defined in claim 1 wherein said brake arch is formed by forging.

4. The method as defined in claim 1 wherein said brake arch is formed by machining.

5. The method as defined in claim 1 wherein said fork legs are formed by die casting.

6. The method as defined in claim 1 wherein said fork legs are formed by forging.

7. The method as defined in claim 1 wherein said fork legs are formed by machining.

8. The method as defined in claim 1 wherein said brake arch is formed with an integral brake cable stop located at said bent top section.

9. The method as defined in claim 1 wherein said brake arch is formed with two integral wheel rim brake post each located at a respective one of said two generally straight sections.

10. The method as defined in claim 1 wherein said structural adhesive used in said bonding step is epoxy.

11. A bicycle brake arch and fork legs assembly produced according to the method as defined in claim 1.

12. A method for producing a bicycle brake arch and fork legs assembly, comprising the steps of:
   a. forming a low-tolerance brake arch which has a generally U-shaped configuration with two integral connecting portions, each integral connecting portion havinq a tubular connector with a through bore;
   b. forming two low-tolerance fork legs each having an elongated body;
   c. holding said brake arch and two fork legs in high-precision alignment and orientation, where each one of said throuqh bores of said tubular connectors of said two connecting portions of said brake arch receives respectively a connecting portion of a respective one of said two fork legs; and
   d. bonding said connecting portions of said two fork legs with said tubular connectors of said two connecting portions of said brake arch respectively with an adhesive;
   e. whereby said low tolerance brake arch and said two low tolerance fork legs are bonded as a unified piece with high-precision alignment and orientation.

13. The method as defined in claim 12 wherein said brake arch is formed by die casting.

14. The method as defined in claim 12 wherein said brake arch is formed by forging.

15. The method as defined in claim 12 wherein said brake arch is formed by machining.

16. The method as defined in claim 12 wherein said fork legs are formed by die casting.

17. The method as defined in claim 12 wherein said fork legs are formed by forging.

18. The method as defined in claim 12 wherein said fork legs are formed by machining.

19. The method as defined in claim 12 wherein said brake arch is formed with an integral brake cable stop.

20. The method as defined in claim 12 wherein said brake arch is formed with two integral wheel rim brake post.

21. The method as defined in claim 12 wherein said adhesive used in said bonding step is epoxy.

22. A bicycle brake arch and fork legs assembly produced according to the method as defined in claim 12.

* * * * *